Nov. 28, 1961 H. G. SPIER 3,010,294
GEAR-TYPE MISALIGNMENT COUPLING
Filed March 30, 1961 2 Sheets-Sheet 1

INVENTOR.
HANS G. SPIER
BY Owen & Owen
ATTORNEYS

INVENTOR.
HANS G. SPIER
BY Owen & Owen
ATTORNEYS

United States Patent Office 3,010,294
Patented Nov. 28, 1961

3,010,294
GEAR-TYPE MISALIGNMENT COUPLING
Hans G. Spier, Media, Pa., assignor to Baldwin-Lima-Hamilton Corporation, Philadelphia, Pa., a corporation of Pennsylvania
Filed Mar. 30, 1961, Ser. No. 99,604
6 Claims. (Cl. 64—9)

This invention relates to a device for transmitting power between a pair of misaligned shafts, and more particularly to a misalignment coupling for connecting rotating shafts where the power to be transmitted therebetween is quite high. The misalignment coupling of the invention is especially useful in marine service for connecting the drive shaft of a prime mover to a propeller shaft.

Gear-type couplings are used to connect a pair of misaligned shafts and transmit power therebetween. A coupling of this type utilizes a pair of mating members, such as a hub and sleeve, and each member is connected to one of the misaligned shafts. Each member has teeth formed thereon and torque is transmitted from one member to another through the teeth when they are in meshing relationship. The misalignment between the shafts may be angular, parallel offset, or a combination of both, and the meshing teeth move relative to each other with both sliding and rolling motions because one of the toothed members is angularly disposed relative to the other when the shafts are so misaligned.

Rolling motion between the teeth is preferable because such a motion facilitates the lubrication of the teeth, and the lubrication problem is particularly important when the loading on an individual tooth becomes quite high. Unequal loading on the teeth occurs because clearance is provided between adjacent teeth to enable one of the toothed members to be skewed relative to the other as the coupling rotates. More particularly, at any instant during the rotation of the coupling the teeth that are on the side of the coupling toward which the axes of the toothed members are skewed are more heavily loaded than the teeth on the opposite side.

The degree of parallel offset or combined angular and parallel offset misalignment which can be accommodated by a gear-type coupling is determined by the configuration of the meshing teeth because interference of the teeth will occur if one toothed member is excessively skewed in relation to the other toothed member. Removing a portion of each tooth will reduce this interference and increase the misalignment capacity of a coupling, but when the thickness of the tooth is decreased in the direction in which the force is transmitted, the strength of the tooth may be reduced to such a degree that breakage may occur.

It is, therefore, an object of the invention to provide a coupling of such strength as to positively transmit power between misaligned shafts in a satisfactory fashion with a minimum of wear.

Another object of the invention is to provide a misalignment coupling which will transmit power from one shaft to another when the shafts are either aligned or misaligned, whether the misalignment is parallel offset, or angular, or both.

A further object of the invention is to provide a gear-type misalignment coupling that will function for light or heavy loads under severe operating conditions throughout a long life of service.

A still further object of the invention is to provide a gear-type misalignment coupling that is capable of being effectively lubricated with consequent greater wearing qualities.

Still another object of the invention is to provide a gear-type misalignment coupling having not only crowned teeth for accommodating angular misalignment wherein the highly stressed point contact of each crowned flank is confined to substantially rolling action only, but also spline teeth to accommodate axial misalignment wherein the sliding action is confined to full line contact for effective lubrication.

Other and more specific objects will be apparent from the specification which follows and from the drawings in which like numbers are used throughout to identify like parts.

In order to achieve the above objects, the coupling of the invention comprises a shaft having a hub mounted on each end, each hub being receivable in a respective sleeve that is mounted on one of the misaligned shafts. A plurality of ring segments are interposed between each of the hubs and its respective sleeve, and each ring segment is provided with external spline teeth which mate with internal spline teeth on the sleeve as well as internal straight sided teeth which mesh with crowned external teeth on the hub. Only enough clearance is provided between the spline teeth to accommodate axial sliding motion between these teeth and consequently the spline teeth are equally loaded.

The rolling motion required to enable the hub to be skewed relative to the sleeve occurs between the crowned hub teeth and the mating straight involute teeth on the ring segments. This movement between these teeth is limited to a substantially rolling motion because retainers at each end of the ring engage the hub to limit the axial motion of the hub relative to the ring. The tooth loading of the crowned teeth is higher than that of the spline teeth; however, the crowned teeth are more readily and effectively lubricated because the motion between the contacting tooth surfaces is limited to a substantially rolling engagement, the requisite sliding motion being taken in the mesh between the ring segments and sleeve.

Figure 1:
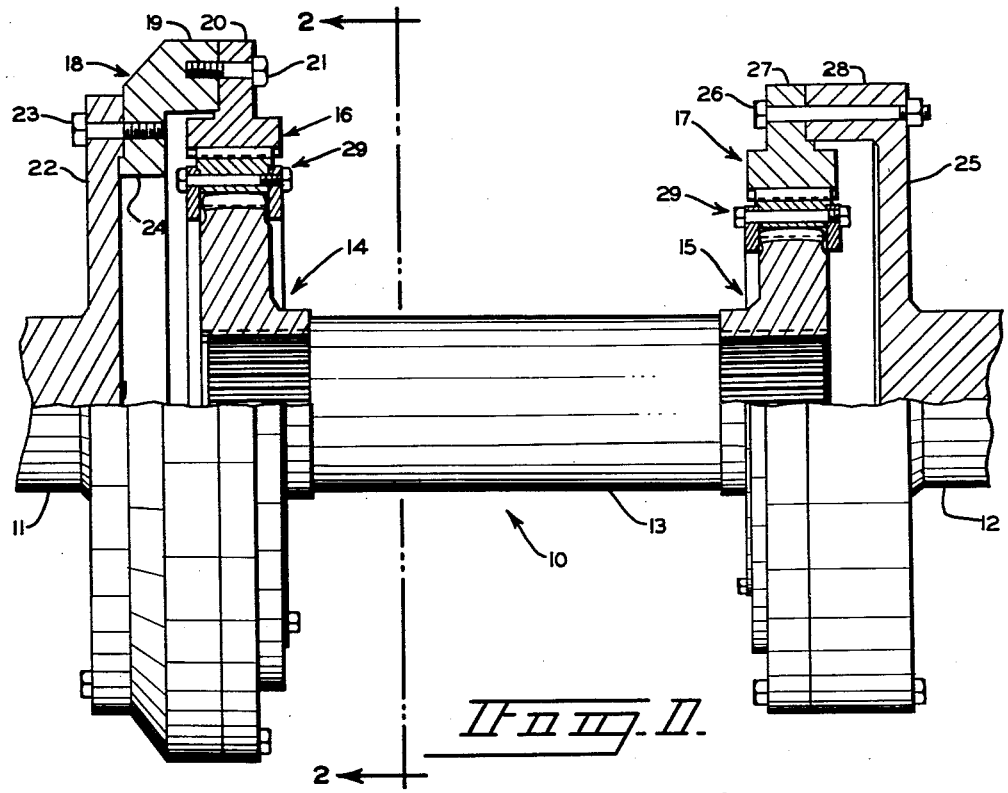
FIG. 1 is a part axial section, part side view of a gear-type misalignment coupling made according to the invention.

Referring now to the drawings, there is shown in FIG. 1 a misalignment coupling 10 that is used to transmit power between a rotating input shaft 11 which is driven by a prime mover, such as a marine power plant, and a driven output shaft 12 which may, for example, be connected to a propeller or other power consumer. The shafts 11 and 12 are quite large in marine service, and the power transmitted therebetween may be quite high. For example, such shafts may have a nominal torque rating as high as 400,000 foot-pounds, and under certain conditions overload torques of 150 percent of the nominal power rating can be expected while the torque may even exceed 200 percent of the nominal torque rating under emergency conditions.

The prime mover (not shown) rotates the input shaft 11 about an axis which extends along its center line while the output shaft 12 is likewise rotatable about a similar axis. In normal service the axes of these shafts are usually misaligned because of normal and expected errors in installation and the misalignment may be "parallel offset" where the axes are parallel but offset from one another, or "angular" where the axes intersect at an angle to one another. Usually the misalignment of the shafts 11 and 12 is combined parallel offset and angular. The shafts 11 and 12 may also be "axially misaligned" in which case they shift along their axes towards and away from each other during service.

The misalignment coupling 10 of the invention is capable of accommodating combined parallel offset and angular misalignment as well as either type of misalignment individually. The coupling 10 preferably comprises an elongated member such as a shaft 13 located between the input shaft 11 and the output shaft 12 for rotation about its normal axis. A forward hub 14 is mounted on one end of the shaft 13 adjacent the input shaft 11 while a substantially identical hub 15 is mounted on the opposite end of the shaft 13 adjacent the output shaft 12. If desired, the hubs 14 and 15 may be formed integral with the shaft 13, or they may be made separately and rigidly mounted thereon by any convenient means such as by spline connections. The use of the center shaft 13 with a coupling at each end is a recognized expedient to accommodate substantial misalignment without attempting to correct it in a single mesh.

The misalignment coupling 10 further comprises a forward sleeve 16 which receives the forward hub 14 and a rear sleeve 17 which receives the rear hub 15. The sleeve 16 is secured to the input shaft 11 in any convenient manner. For example, a suitable adapter ring 18 that has a longitudinally extending flange 19 for engaging the radially extending shoulder 20 on the sleeve 16 may be used as shown in FIG. 1. The adapter ring 18 uses a plurality of bolts 21 which extend through the shoulder 20 into the flange 19 to rigidly mount the sleeve 16 thereon.

The adapter ring 18 is secured to an enlarged end portion 22 of the input shaft 11 by bolts 23 which pass therethrough and are threadably received in a radially extending flange 24 on the adapter ring 18. The flange 24 is properly located relative to the axis of the shaft 11 by a pilot portion which engages a mating pilot portion on the end portion 22. If desired the flange 24 may extend radially inward a sufficient distance to eliminate the enlarged end portion 22, and in such case the flange 24 is secured directly to the end of the shaft 11.

The rear sleeve 17 shows another means of establishing a driving connection to the coupling. In this case the sleeve 17 is mounted directly on an enlarged end 25 of the output shaft 12 by a plurality of bolts 26 which pass through both a radially extending shoulder 27 on the sleeve 17 and an axially extending flange 28 on the enlarged end 25 of the shaft 12.

Figure 2:
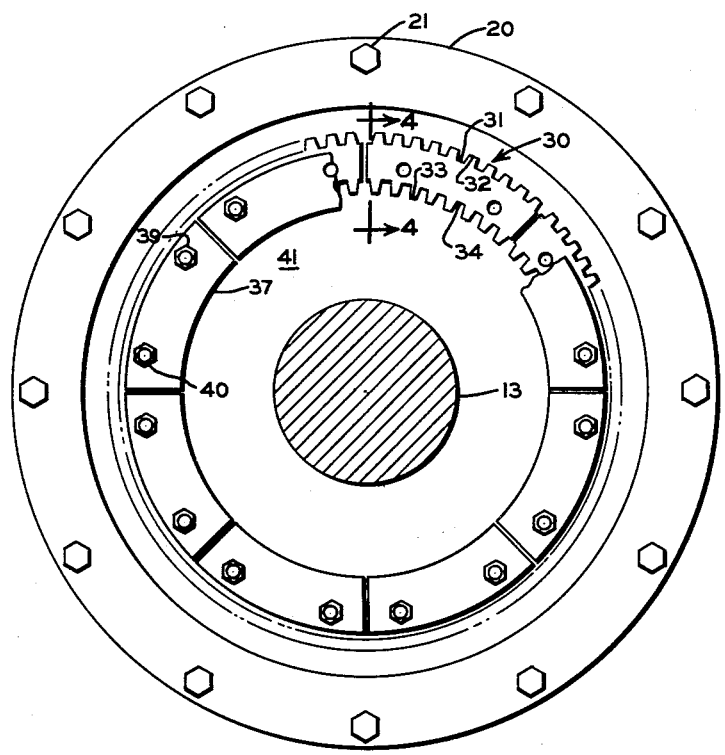
FIG. 2 is a sectional view, with parts broken away, taken along the line 2—2 in FIG. 1.

An assembly 29 is utilized by the present invention to transmit torque between the hubs 14 and 15 and the sleeves 16 and 17 as shown in FIGS. 1 and 2. Inasmuch as identical assemblies 29 are used on both ends of the coupling 10, a portion of a hub identified by the letter H in FIG. 4 designates either a portion of the hub 14 or the hub 15 of FIG. 1. Likewise a portion of the sleeve identified by the letter S in FIG. 4 may be either a portion of the sleeve 16 or the sleeve 17 of FIG. 1.

An important feature of the assembly 29 is the provision of a plurality of ring segments 30 that are interposed between the hub H and the sleeve S. The provision of ring segments 30 in contrast with a single ring member is an important feature of the invention because these segments enable the coupling 10 to be angularly deflected. It is desirable to use as many segments 30 as possible, but an excessive number of these segments is impractical because of the presence of undue edging forces.

Figure 4:
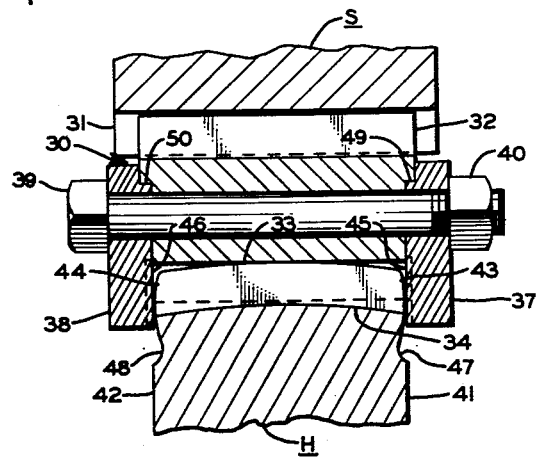
FIG. 4 is an enlarged sectional view of a portion of the coupling, taken along the line 4—4 of FIG. 2.

The sleeve S has a plurality of internal spline teeth 31 formed on the interior surface thereof which mate with a plurality of external spline teeth 32 formed on the outer peripheral surface of each ring segment 30. Sufficient clearance is provided between the teeth 31 and 32 to enable these teeth to slide axially relative to each other, and as shown in FIG. 4 the teeth 31 are substantially longer than the teeth 32 to accommodate this motion. Referring to FIG. 2 tangential forces in the segments 30 will tend to move them into the sleeve S and away from the hub H. This movement is minimized by controlling the clearances between the tops and bottoms of the teeth 31 and 32.

Figure 3:
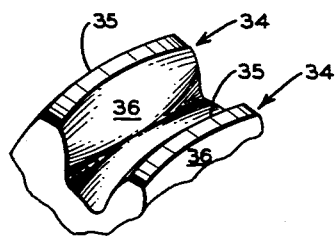
FIG. 3 is an enlarged perspective view of one of the crowned teeth in the coupling.

Each ring segment 30 also has a plurality of straight sided involute internal teeth 33 formed on the internal surface thereof which mesh with a plurality of mating external involute teeth 34 formed on the peripheral surface of hub H. As shown in FIG. 3 each of the teeth 34 has a tip 35 that is crowned; that is, the top of each tooth on the addendum circle is curved to enable the hub H to rotate with respect to the axis of the ring 30 in normal service of the coupling 10. Each of the teeth 34 also has oppositely disposed flanks 36 which are likewise crowned; that is, each flank or side face of the tooth between the root circle and the addendum circle is curved outwardly to enable the teeth 34 to roll along mating flanks or side faces of the teeth 33 during normal service of the coupling 10.

Axial motion between the hub H and the ring segments 30 is prevented by a pair of segmented retainers 37 and 38 mounted on oppositely disposed ends of each ring segment 30 by bolts 39 which extend through the retainers 37 and 38 as well as through the ring segment 30. A nut 40 on each bolt 39 tightens the retainers 37 and 38 against the ring segments 30.

The hub H has spaced, planar faces 41 and 42 which extend radially outward from the axis of the shaft 13 on oppositely disposed sides of the hub H, as shown in FIG. 4. Also, the external teeth 34 have curved end faces 43 and 44 which likewise extend radially outward from the spaced, planar faces 41 and 42 respectively. Each retaining member 37 extends radially inward from its respective ring segment 30 and has a surface 45 which engages the face 43 on one end of the external teeth 34 while each retaining member 38 on the opposite end of its respective ring segment 30 extends radially inward therefrom and has a surface 46 which engages the face 44 on the other end of the external teeth 34.

As shown in FIG. 4, the spacing between the retainers 37 and 38 is substantially equal to the spacing between the end faces 41 and 42 of the hub H which is determined by the thickness of the hub H, and consequently axial movement of the hub H relative to the ring 30 is limited to the clearance between the surfaces 43 and 45 as well as the clearance between the surfaces 44 and 46. As the number of segments 30 increases these clearances decrease because the sectional arcs are relatively short. As the teeth 34 roll along the teeth 33 the surfaces 45 and 46 move along the curved end faces 43 and 44 respectively of the teeth 34, and the individual ring segments 30 are moved axially by the retainers 37 and 38 to accommodate angular deflections. The surfaces 45 and 46 are preferably tapered from the center toward each end to enable each ring segment 30 to be skewed relative to the hub H.

Angular motion of the hub H relative to the ring segments 30 is accommodated by undercutting a marginal surface portion 47 of the planar surface 41. Likewise a marginal surface portion 48 of the planar surface 42 is also undercut, and the retainers 37 and 38 slidably engage these undercut portions as the hub H becomes skewed relative to the ring 30 during normal service of the coupling 10.

As shown in FIG. 4, the opposite ends of the ring segments 30 are accurately finished to maintain the proper spacing between the surfaces 45 and 46 on the retainers 37 and 38, and the proper radial spacing of these retainers is maintained by shoulders 49 and 50 on each ring segment 30 which engage corresponding shoulders on the retainers 37 and 38 respectively.

The heaviest tooth loadings occur between the teeth 33 and 34 whose relative movement is limited to substantially rolling motion while relative axial motion between the coupling teeth is restricted to the teeth 31 and 32 which have a much lighter tooth loading. The lower unit loadings on the spline teeth enable these teeth to be readily lubricated even though the sliding contact between the engaging surfaces of these teeth is normally more difficult to lubricate than the rolling contact between the teeth 33 and 34.

The spline teeth 32 are on the outer peripheral surface of the ring segments 30 while the crowned teeth 34 are on the peripheral surface of the hub H. Thus a greater number of spline teeth may be utilized which aids in decreasing the loading on each spline tooth.

For example, a typical coupling 10 uses fifteen ring segments 30 having a total of 120 spline teeth 32 which mesh with a corresponding number of spline teeth 33 on the respective sleeves 16 and 17. The same coupling uses a hub H having 105 crowned teeth 34 meshed with a corresponding number of straight teeth 33 on the ring segments 30. In this coupling the loading on the spline teeth 31 and 32 is 1400 pounds per tooth when all the teeth are in mesh while the loading on the crowned teeth 34 is 1830 pounds when all teeth are in mesh. Because of the increased contacting surface on the spline teeth 31 and 32, the stress on these teeth is only 4560 pounds per square inch for the 1400 pound loading while the stress on the crowned teeth 34 is 17,923 pounds per square inch for the 1830 pound loading.

It will be appreciated that the loading on the crowned teeth 34 increases considerably when less than all of the teeth are in mesh. However, the motion between the teeth that carry extremely high tooth loadings is a rolling motion which is more readily and effectively lubricated than the sliding motion that is present between the spline teeth. During extreme angular deflection, the above listed stresses may be 7½ times greater than those listed for normal operation.

While the preferred embodiment of the invention has been shown and described, it should be expressly understood that modifications and changes may be made without departing from the invention as defined in the appended claims.

I claim:

1. In a coupling for transmitting power between misaligned shafts, a hub operatively connected to one of the misaligned shafts, a plurality of external teeth on said hub, a plurality of torque transmitting members surrounding said hub, a plurality of internal teeth on each of said torque transmitting members for meshing with said teeth on said hub, means for connecting said torque transmitting members to another of the misaligned shafts, and retaining members extending radially inward from each of said torque transmitting members for engaging said hub to limit axial movement between said torque transmitting members and said hub.

2. In a coupling for transmitting power between misaligned shafts, a hub having spaced, radially extending faces, means for connecting said hub to one of the misaligned shafts, a plurality of external teeth on the peripheral surface of said hub, said external teeth extending between said spaced surfaces and having oppositely disposed end faces extending radially outward from spaced faces on said hub, a plurality of torque transmitting members surrounding said hub, a plurality of internal teeth on each of said torque transmitting members for meshing with said external teeth on said hub, means for connecting said torque transmitting members to another of the misaligned shafts, said external teeth being crowned for rolling engagement with said internal teeth, and retaining members mounted on each of said torque transmitting members and extending radially inward therefrom, said retaining members being adapted to engage a marginal portion of said spaced faces on said hub to limit axial movement between said torque transmitting members and said hub.

3. In a coupling for transmitting power between misaligned shafts, a hub operatively connected to one of the misaligned shafts, said hub having spaced faces extending radially outward on oppositely disposed sides thereof, a plurality of external teeth on the peripheral surface of said hub extending between said spaced faces, said external teeth having faces at each end thereof extending radially outward from said spaced faces on said hub, a plurality of torque transmitting members surrounding said hub, a plurality of internal teeth on each of said torque transmitting members for meshing with said external teeth on said hub, means for connecting said torque transmitting members to another of the misaligned shafts, said external teeth being crowned for rolling engagement with said internal teeth, a plurality of first retaining members mounted on said torque transmitting members, at least one of said first retaining members being mounted on one side of each torque transmitting member and extending inwardly therefrom to engage said faces on one end of said external teeth adjacent said torque transmitting member, and a plurality of second retaining members mounted on said torque transmitting members, at least one of said second retaining members being mounted on the opposite side of each torque transmitting member and extending inwardly therefrom to engage said face on the other end of said external teeth, said first and said second retaining members having a spacing therebetween substantially equal to the spacing between said spaced faces on said hub.

4. In a coupling for transmitting power between misaligned shafts, a hub operatively connected to one of the misaligned shafts, said hub having substantially planar faces on oppositely disposed sides thereof, said planar faces having a predetermined spacing therebetween, a plurality of external teeth on the peripheral surface of said hub, said external teeth having oppositely disposed end faces extending outward from said planar faces, the spacing between said end faces being substantially equal to said predetermined spacing, a plurality of torque transmitting members surrounding said hub, a plurality of internal teeth on each of said torque transmitting members for meshing with said external teeth on said hub, means for connecting said torque transmitting members to another of the misaligned shafts, said external teeth on said hub being contoured for rolling engagement with said internal teeth on said torque transmitting members, a plurality of first retaining members mounted on said torque transmitting members, at least one of said first retaining members being mounted on one side of each torque transmitting member and extending inwardly therefrom to engage said end faces on one end of said external teeth, and a plurality of second retaining members mounted on said torque transmitting members, at least one of said second retaining members being mounted on the opposite side of each torque transmitting member and extending inwardly therefrom to engage said end face on the other end of said external teeth, said first and said second retaining members having a spacing therebetween substantially equal to said predetermined spacing, a portion of each of said planar faces being undercut immediately adjacent each of said end faces to accommodate angular motion between said hub and said torque transmitting members while limiting movement therebetween.

5. In a coupling for transmitting power between misaligned shafts, a hub operatively connected to one of the misaligned shafts, said hub having substantially planar faces on oppositely disposed sides thereof, a plurality of external teeth on said hub extending between said planar faces, said external teeth having end faces extending outwardly from said planar faces, a plurality of ring segments surrounding said hub for transmitting torque therefrom, a plurality of internal teeth on each of said ring segments for meshing with said external teeth on said hub, said external teeth on said hub being crowned for rolling engagement with said internal teeth on said ring segments, a plurality of external spline teeth on each of said ring segments, a sleeve surrounding said ring segments, a plurality of internal spline teeth on the interior surface of said sleeve for meshing with said external spline teeth on said ring segments, and a plurality of retaining members extending inwardly from said ring segments for engaging said hub to limit axial movement between said ring segments and said hub.

6. A coupling for transmitting power between a pair of shafts having misaligned axes, said coupling comprising an elongated member interposed between the misaligned shafts, said elongated member being rotatable about its normal axis, a first toothed member mounted on each end of said elongated member for rotation about said normal axis, a plurality of external teeth on each of said first tooth members, a second toothed member mounted adjacent each of said first toothed members, a plurality of internal teeth on each of said second toothed members, securing means for mounting one of said second toothed members to each of the shafts for rotation about the axis thereof, torque transmitting members interposed between each of said first toothed members and said second toothed members, a plurality of external teeth on said torque transmitting members for meshing with the internal teeth on said second toothed member, a plurality of internal teeth on said torque transmitting members for meshing with the external teeth on said first toothed member, said external teeth on said first toothed member being crowned for rolling engagement with said internal teeth on torque transmitting members, and retaining members extending inwardly from said torque transmitting members for engaging said first toothed member to limit axial movement between said torque transmitting members and said first toothed member.

References Cited in the file of this patent

UNITED STATES PATENTS

| | | |
|---|---|---|
| 1,630,544 | Smith et al. | May 31, 1927 |
| 1,905,431 | Banner | Apr. 25, 1933 |
| 1,979,306 | Banner | Nov. 6, 1934 |
| 2,871,682 | Tacke et al. | Feb. 3, 1959 |